United States Patent
Yoon et al.

(10) Patent No.: US 7,492,768 B2
(45) Date of Patent: Feb. 17, 2009

(54) SYSTEM AND METHOD FOR VLAN CONFIGURATION OF E-PON, AND RECORDING MEDIUM WITH STORED PROGRAM THEREOF

(75) Inventors: Hyeon-Sik Yoon, Daejeon (KR); Sun-Hee Yang, Daejeon (KR); Jae-Heum Lee, Daejeon (KR)

(73) Assignee: Electronics and Telecommunications Research Institute (KR)

( * ) Notice: Subject to any disclaimer, the term of this patent is extended or adjusted under 35 U.S.C. 154(b) by 1301 days.

(21) Appl. No.: 10/449,541

(22) Filed: May 30, 2003

(65) Prior Publication Data
US 2004/0120326 A1   Jun. 24, 2004

(30) Foreign Application Priority Data
Dec. 24, 2002   (KR) .............. 10-2002-0083088

(51) Int. Cl.
    *H04L 12/28* (2006.01)
(52) U.S. Cl. ............ 370/392; 370/395.31; 370/395.53
(58) Field of Classification Search ........... 370/389, 370/395.2, 395.21, 395.3, 395.53, 395.54, 370/397, 399, 401, 402, 409, 420–422, 910, 370/392, 395.31, 395.32
See application file for complete search history.

(56) References Cited

U.S. PATENT DOCUMENTS

| | | | |
|---|---|---|---|
| 6,801,497 B1 * | 10/2004 | Van Driessche | 370/225 |
| 7,272,137 B2 * | 9/2007 | Unitt et al. | 370/389 |
| 7,301,968 B2 * | 11/2007 | Haran et al. | 370/508 |
| 2003/0117998 A1 * | 6/2003 | Sala et al. | 370/351 |
| 2003/0236852 A1 * | 12/2003 | Fernandes et al. | 709/215 |

FOREIGN PATENT DOCUMENTS

| | | |
|---|---|---|
| JP | 09-098171 | 4/1997 |
| JP | 09-289521 | 11/1997 |
| KR | 1020020017265 | 3/2002 |
| KR | 1020020051191 | 6/2002 |

OTHER PUBLICATIONS

Anderson et al. "MPCP Auto Discovery Baseline Proposal" IEEE 802.3ah St. Louis, MO, Mar. 12-14, 2002.*

* cited by examiner

Primary Examiner—Kwang B Yao
Assistant Examiner—Alex Skripnikov
(74) Attorney, Agent, or Firm—Blakely, Sokoloff, Taylor & Zafman

(57) ABSTRACT

A system and method for VLAN configuration of an E-PON converts physical ONU port information to logical OLT port information to construct profile information of the logical OLT system and VLAN membership information based on the logical OLT port, and provides a VLAN service to the users of an optical subscriber network. Accordingly, the present invention allocates the users in the ONU systems belonging to the same OLT port to different VLAN groups, provides enhanced VLAN services for the E-PON users, causes the OLT to perform functions of managing the profile of the ONU systems and transferring information among the users of the ONU systems, and causes the ONU systems to operate as terminals performing a multiplexing/demultiplexing function rather than as a conventional two-layer switch.

14 Claims, 8 Drawing Sheets

PRIOR ART

PRIOR ART

FIG.4

Physical port/Logical port mapping table

| Logical port | Physical port | | | LLID |
| --- | --- | --- | --- | --- |
| | OLT Port | ONU ID | ONU Port | |
| Logical Port 1 | OLT Port 1 | ONU 1 | ONU Port 1 | LLID 1 |
| Logical Port 2 | OLT Port 1 | ONU 1 | ONU Port 2 | LLID 2 |
| Logical Port 3 | OLT Port 1 | ONU 1 | ONU Port 3 | LLID 3 |
| Logical Port m | OLT Port 1 | ONU 1 | ONU Port m | LLID m |
| | | | | |
| Logical Port (i+1) | OLT Port j | ONU 1 | ONU Port 1 | LLID (i+1) |
| Logical Port (i+2) | OLT Port j | ONU 1 | ONU Port 2 | LLID (i+2) |
| Logical Port (i+3) | OLT Port j | ONU 1 | ONU Port 3 | LLID (i+3) |
| Logical Port (i+m) | OLT Port j | ONU 1 | ONU Port m | LLID (i+m) |
| Logical Port (i+l+1) | OLT Port j | ONU 2 | ONU Port 1 | LLID (i+l+1) |
| Logical Port (i+l+2) | OLT Port j | ONU 2 | ONU Port 2 | LLID (i+l+2) |
| Logical Port (i+l+3) | OLT Port j | ONU 2 | ONU Port 3 | LLID (i+l+3) |
| Logical Port (i+l+m) | OLT Port j | ONU 2 | ONU Port m | LLID (i+l+m) |
| | | | | |
| Logical Port (i+k*l+1) | OLT Port j | ONU k | ONU Port 1 | LLID (i+k*l+1) |
| Logical Port (i+k*l+2) | OLT Port j | ONU k | ONU Port 2 | LLID (i+k*l+2) |
| Logical Port (i+k*l+3) | OLT Port j | ONU k | ONU Port 3 | LLID (i+k*l+3) |
| Logical Port (i+k*l+m) | OLT Port j | ONU k | ONU Port m | LLID (i+k*l+m) |

FIG.5A

| Preamble | Destination Address | Source Address | Type | Data | CRC |
|---|---|---|---|---|---|
| 8 bytes | 6 bytes | 6 bytes | 4 bytes | 46–1,500 bytes | 4 bytes |

FIG.5B

| SFD | LLID | Reserved | CRC |
|---|---|---|---|
| 1 byte | 2 bytes | 4 bytes | 1 byte |

FIG.5C

| Mode ID | ONU system ID | ONU port ID |
|---|---|---|
| 1 bit | 7 bits | 8 bits |

# SYSTEM AND METHOD FOR VLAN CONFIGURATION OF E-PON, AND RECORDING MEDIUM WITH STORED PROGRAM THEREOF

BACKGROUND OF THE INVENTION (a) Field of the Invention

The present invention relates to a system and method for virtual LAN (VLAN) configuration of an E-PON (Ethernet-Passive Optical Network), and a recording medium with a stored program of the system and method. More specifically, the present invention relates to a system and method for VLAN configuration of an E-PON, and a recording medium with a stored program of the system and method that converts physical ONU (Optical Network Unit) port information to logical OLT (Optical Link Terminal) port information to compose VLAN membership information based on the logical OLT port and to provide VLAN services for the users of an optical subscriber network.

(b) Description of the Related Art

Currently, the most widely used ultrahigh-speed Internet services are ADSL (Asymmetric Digital Subscriber Line) and Cable Modem services. ADSL uses the existing telephone lines with an ADSL modem installed in the user's computer to provide high-speed Internet service with speeds of 2 to 10 Mbps.

Cable Modems use the existing coaxial cable connection for cable TV service with a cable modem installed in the user's PC, so it can provide ultrahigh-speed Internet service to the user who uses the cable TV service.

These ultrahigh-speed Internet services are satisfactory in performance in providing services such as Internet web surfing (HTTP), E-mail, file transfer (FTP), etc. with much higher transmission capacity of 2 to 10 Mbps, compared with the traditional telephone line modem having a speed of 56 Kbps, but they still have the limitation in meeting the users' emerging requirements such as VoIP (Voice over Internet Protocol), VoD (Video on Demand), Internet broadcasting service, etc.

Moreover, the Cable Modem ultrahigh-speed Internet service is disadvantageous in that its bandwidth decreases with a larger number of users, while the ADSL ultrahigh-speed Internet service has its available bandwidth decrease with an increase in the distance between the central telephone exchange and the user network.

In an attempt to solve this problem, there have been suggested FTTH (Fiber To The Home), FTTB (Fiber To The Building), or FTTC (Fiber To The Curb) that uses an optical cable connection to the subscriber in-home network. In addition, many studies have been made on E-PON (Ethernet-Passive Optical Network) for the sake of enhancing the price-to-service ratio.

E-PON is an Ethernet-associated network constructed with passive elements rather than power-consuming active elements in the optical subscriber network so as to enhance the cost advantage.

The IEEE (Institute of Electrical and Electronics Engineers) 802.3ah Ethernet in the first Mile Task Force has been developing the standard for E-PON.

Now, a description will be given as to a VLAN service providing method of E-PON according to prior art.

FIG. 1 is a schematic diagram of the E-PON according to prior art.

As shown in FIG. 1, the E-PON has a point-to-multipoint structure that includes a plurality of ONUs (Optical Network Units) connected to one OLT (Optical Line Terminal) port through a passive element, a splitter.

Data transfer between an OLT and ONUs is done in the units of an Ethernet frame. Downstream signals from an OLT to ONUs transfer data by broadcasting, and upstream signals from ONUs to an OLT enable allocated bandwidths to be shared among the multiple ONUs by the TDMA (Time Division Multiple Access) method.

FIG. 2 is a configuration diagram of a port-based VLAN service applied to on the OLT that is a partial component of FIG. 1 according to the example of prior art.

The port-based VLAN service configuration on the OLT as shown in FIG. 2 generates VLAN groups, and determines members included in the VLAN groups to construct a VLAN membership table.

The subscriber interface device of the OLT determines the VLAN group of an input frame with reference to the generated VLAN membership table, and provides the VLAN service.

Namely, if the VLAN service is not applied, then the broadcasting traffic is transferred to all the ports in the OLT system; otherwise, if the VLAN service is applied, then it is transferred to only the member ports that belong to the same VLAN group.

In this manner, the VLAN service providing method of an E-PON reduces a system load imposed by the broadcasting traffic and supports mobility and security of users.

As in the case of applying the VLAN function to a two-layer switch, the ONUs connected to one OLT port are inevitably allocated to one VLAN group according to the port-based VLAN function applied on the OLT.

There is thus a demand for a function of dividing the users connected to a same ONU into different groups. However, this function is unfortunately impossible to implement in the method of VLAN configuration based on the OLT port.

SUMMARY OF THE INVENTION

It is an advantage of the present invention to solve the problems with prior art and to provide a system and method for VLAN configuration of an E-PON, and a recording medium with a stored program of the system and method, that divides users in the ONUs connected to one OLT port into different VLAN groups.

In one aspect of the present invention, there is provided a system for virtual LAN constitution of an E-PON (Ethernet-Passive Optical Network) that includes: a plurality of ONUs (Optical Network Units) installed in a subscriber terminal, the ONUs carrying a port ID (Identification) number and its system ID number on a logical link identifier and transferring an Ethernet frame including the logical link identifier; and an OLT (Optical Link Terminal) installed in a central telephone exchange or a headend, the OLT determining a virtual LAN group allocated to its logical port using the ID of its port that receives the Ethernet frame from the plural ONUs and the logical link identifier included in the Ethernet frame, and providing a corresponding virtual LAN service.

The ONUs are connected to the OLT via an E-PON interface. The OLT maps its profile information and profile information of the ONUs to construct a virtual LAN membership table based on the logical port.

The mapping between the OLT and the ONUs is coupling a physical OLT port number, an ONU ID number, an ONU port number, and the corresponding logical link identifier to a logical port number of the OLT.

The virtual LAN membership table includes an ID number of each virtual LAN group allocated to the logical port number of the OLT.

In another aspect of the present invention, there is provided a method for virtual LAN constitution of an E-PON that includes: (A) mapping a port profile of a physical ONU to a port profile of an OLT, and constructing a virtual LAN membership table; (B) the ONU carrying a port number of its port that receives an Ethernet frame from the OLT, and a logical link identifier for an ONU ID number on the Ethernet frame, and transferring the Ethernet frame; (C) upon receiving the Ethernet frame from the ONU in the step (B), the OLT determining a logical OLT port using a port number of its port that receives the Ethernet frame and the logical link identifier; and (D) upon determining the logical OLT port in the step (C), the OLT determining a virtual LAN group of the Ethernet frame from the virtual LAN membership table using information on the logical OLT port, and providing a virtual LAN service for the Ethernet frame.

The step (A) of constructing the virtual LAN membership table includes: (a) combining OLT profile information, and checking whether or not there is an E-PON interface; (b) if there is an E-PON interface according to the step (a), sending a periodic gate message to the E-PON interface so as to check whether or not there is a new ONU; (c) registering the ONU responding to the gate message of the step (b), assigning an ONU system ID number, and informing the ONU of the ONU system ID number; (d) receiving ONU profile information from the ONU acknowledging the ONU system ID number, and constructing a physical port/logical port mapping table using the OLT profile information and the ONU profile information; and (e) constructing a virtual LAN membership table including an ID number of each virtual LAN group allocated to the logical OLT port based on the physical port/logical port mapping table.

The step (d) of constructing a physical port/logical port mapping table includes extracting an ID number of the logical OLT port from the ID numbers of the physical OLT port, the physical ONU system, and the ONU port, by combining these ID numbers.

The ID number of the logical OLT port is calculated according to the following equation:

ID number of logical OLT port=(physical OLT port number×ONU system threshold)+{(ONU system−1)×ONU port threshold}+physical ONU port number where the ONU system threshold is the minimum of second power greater than (the maximum number of ONU systems allowed for one OLT port×ONU port threshold); and the ONU port threshold is the minimum of second powers greater than the maximum number of ports allowed for one ONU system.

The message processing steps (b) and (c) of the ONU include: (i) the ONU receiving a gate message from the OLT, and sending a registration request message to the OLT; and (ii) upon receiving a message including an ONU system ID number from the OLT in response to the registration request message of the step (i), the ONU sending a registration acknowledgement message and its profile information to the OLT.

The step (C) of determining a logical OLT port includes: (a) determining an ID number of the OLT port that receives the Ethernet frame; (b) determining the ONU system ID number and the port ID number from the logical link identifier of the Ethernet frame; and (c) determining the ID number of the logical OLT port from the ID numbers of the OLT port, the ONU system, and the ONU port.

The step (D) of determining a virtual LAN group includes: the OLT determining the virtual LAN group including the Ethernet frame using the logical OLT port information extracted from the received Ethernet frame, according to the ID number of the virtual LAN group allocated to the logical OLT port in constructing the virtual LAN membership table.

The step (D) of providing a virtual LAN service includes: (a) the OLT learning an MAC (Medium Access Control) address of the corresponding virtual LAN group from the source MAC address of the Ethernet frame; (b) if a destination MAC address is not matched to the MAC address of the OLT in the MAC address of the virtual LAN group according to the step (a), the OLT checking whether or not the destination MAC address belongs to the logical OLT port having the same MAC address as the source MAC address; (c) if the destination MAC address does not belong to the logical OLT port having the same MAC address as the source MAC address according to the step (b), the OLT checking whether or not the destination MAC address is registered in the table of the corresponding virtual LAN group; (d) if the destination MAC address is registered in the table of the corresponding virtual LAN group according to the step (c), the OLT sending the Ethernet frame to the logical OLT port having the destination MAC address belonging thereto; and (e) if the destination MAC address is not registered in the table of the corresponding virtual LAN group according to the step (c), the OLT broadcasting the Ethernet frame to all the logical OLT ports having the corresponding virtual LAN group belonging thereto.

If the destination MAC address is matched to the MAC address of the OLT according to the step (b), then an IP routing function is performed instead of a two-layer switch function for the virtual LAN service.

If the destination MAC address belongs to the logical OLT port having the same MAC address as the source MAC address according to the step (c), then the Ethernet frame is discarded.

In still another aspect of the present invention, there is provided a recording medium with a stored program including: a first function of mapping a port profile of a physical ONU to a port profile of a logical OLT, and constructing a virtual LAN membership table; a second function of sending an Ethernet frame transferred from the ONU to a subscriber terminal, the Ethernet frame carrying a port number of a port that receives the Ethernet frame, and a logical link identifier for an ID number of the ONU; a third function of causing the OLT receiving the Ethernet frame to determine a logical OLT port using a port number of its port that receives the Ethernet frame and the logical link identifier; and a fourth function of, upon determination of the logical OLT port, the OLT determining a virtual LAN group of the Ethernet frame from the virtual LAN membership table using the logical OLT port information, and providing a virtual LAN service for the Ethernet frame.

BRIEF DESCRIPTION OF THE DRAWINGS

The accompanying drawings, which are incorporated in and constitute a part of the specification, illustrate an embodiment of the invention, and, together with the description, serve to explain the principles of the invention:

FIG. 4 shows a physical port/logical port mapping table;

FIG. 5a shows the configuration of an Ethernet frame;

FIG. 5b shows the configuration including a logical link ID LLID in the preamble of FIG. 5a;

FIG. 5c shows the configuration of the LLID of FIG. 5b;

DETAILED DESCRIPTION OF THE PREFERRED EMBODIMENTS

In the following detailed description, only the preferred embodiment of the invention has been shown and described, simply by way of illustration of the best mode contemplated by the inventor(s) of carrying out the invention. As will be realized, the invention is capable of modification in various obvious respects, all without departing from the invention. Accordingly, the drawings and description are to be regarded as illustrative in nature, and not restrictive.

Figure 1:
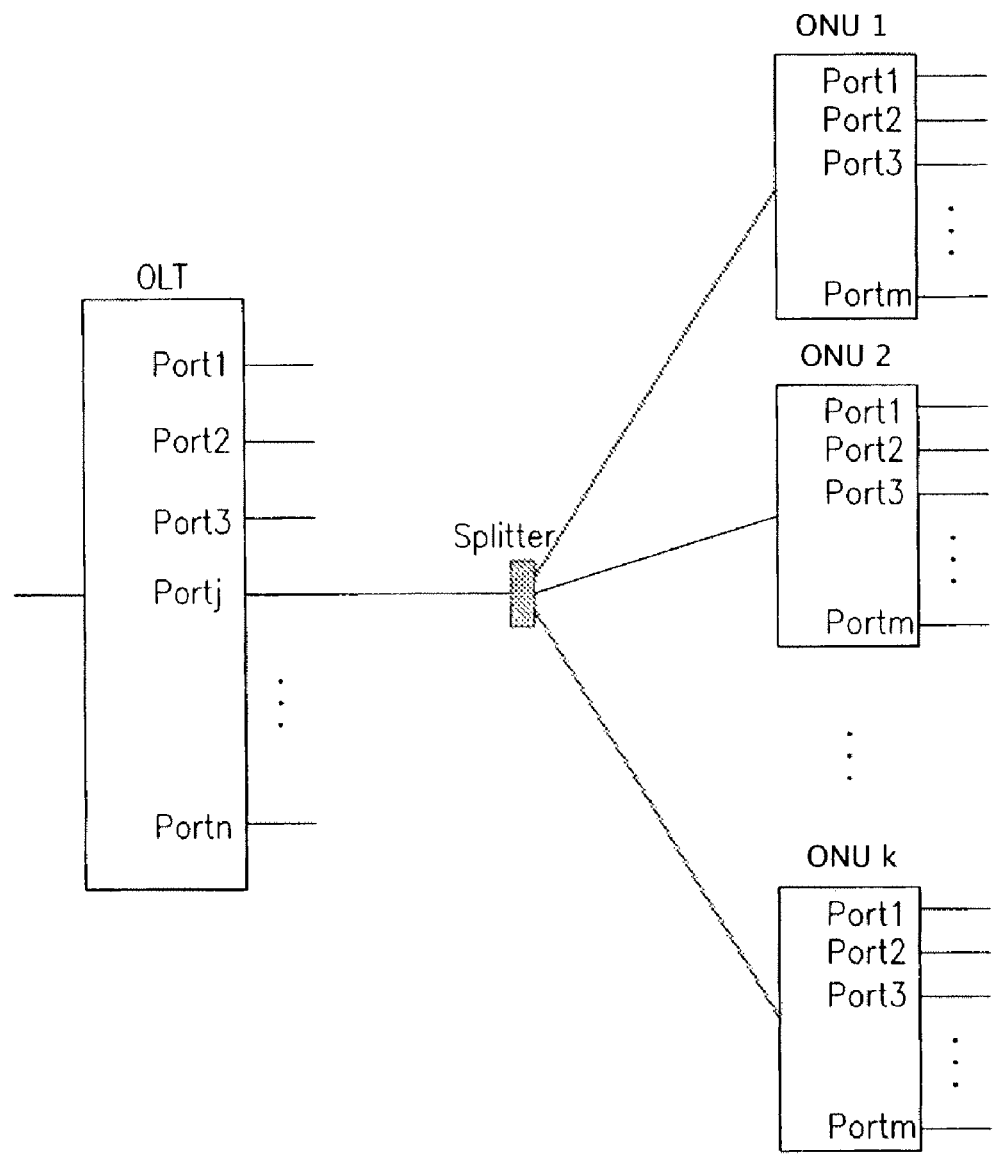
FIG. 1 shows the structure of an E-PON according to an example of prior art.
Figure 2:
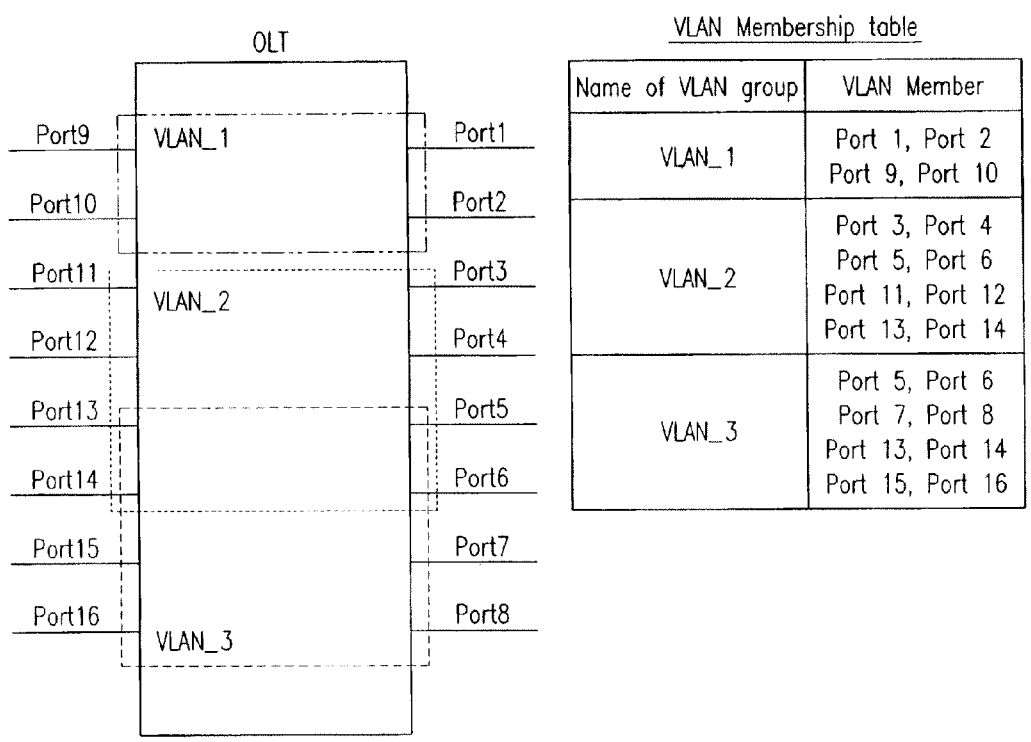
FIG. 2 shows a port-based VLAN service configuration applied on a partial component of FIG. 1, an OLT according to the example of prior art.
Figure 3:
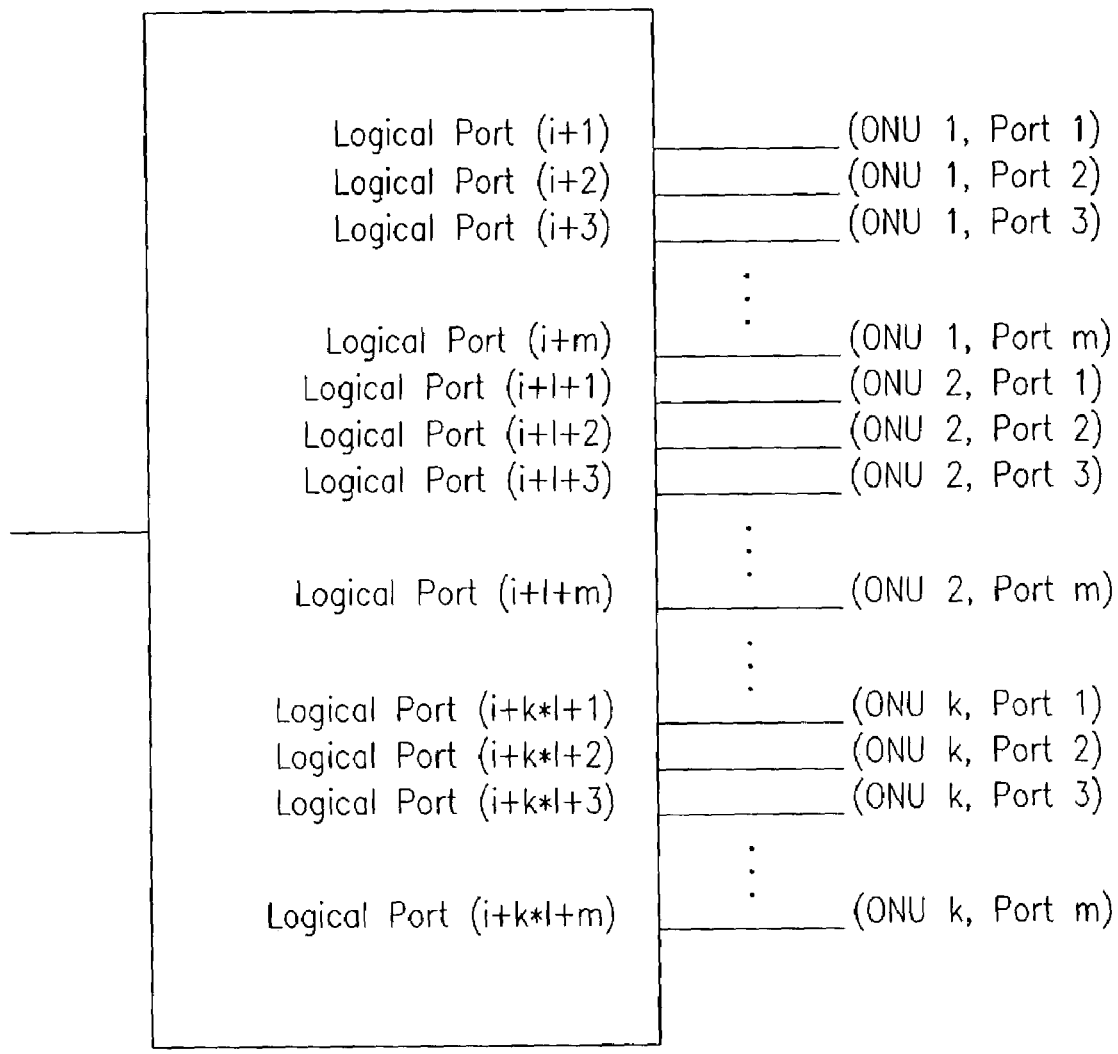
FIG. 3 shows the configuration of a VLAN configuration system of an E-PON according to an embodiment of the present invention.

FIG. 3 shows the construction of a VLAN configuration system of an E-PON according to an embodiment of the present invention.

The system according to the embodiment of the present invention comprises, as shown in FIG. 3, a plurality of ONUs that correspond to one OLT.

The ONUs, installed on the user side, convert a communication interface or an image signal interface and gain access to an optical fiber network. Each ONU carries port IDs and its system ID on a logical link ID, and transmits an Ethernet frame including the logical link ID.

The OLT, installed in a central telephone exchange or a headend, acquires PVID (Port VLAN ID) information allocated to its port by using the ID of its port that receives the Ethernet frame from the ONU, and the LLID in the Ethernet frame; determines VLAN groups; and provides a corresponding VLAN service.

In the meantime, the OLT constructs a VLAN membership table based on the logical OLT ports according to OLT/ONU profile information and allocates the PVID to each VLAN group.

FIG. 4 shows a physical port/logical port mapping table.

The OLT system of E-PON maps physical ONU ports of the E-PON to logical OLT ports using information on the number and profile of ONU systems connected to itself, and the profile information of the physical OLT system.

The method of mapping physical ONU ports to logical OLT ports satisfies the following equation.

ID number of logical OLT port=(physical OLT port number×ONU system threshold)+{(ONU system−1)×ONU port threshold}+physical ONU port number      [Equation 1]

In the above equation, the ONU system threshold is the minimum calue of $2^n$ (n=1, 2, 3, . . .) greater than (the maximum number of ONU systems allowed for one OLT port× ONU Port threshold); and the ONU port threshold is the minimum value of $2^n$ (n=1, 2, 3, . . .) greater than the maximum number of ports allowed for one ONU system.

FIG. 5a shows the configuration of an Ethernet frame, FIG. 5b shows the configuration including a logical link ID LLID in the preamble of FIG. 5a, and FIG. 5c shows the configuration of the LLID of FIG. 5b.

Referring to FIG. 5, upon receiving an Ethernet frame from a subscriber terminal, the ONU carries information on its system ID and port ID receiving the Ethernet frame in the LLID value of the preamble, and sends the LLID value to the OLT.

Then, the OLT uses the LLID value in the preamble of the received Ethernet frame to get information on the logical OLT port that receives the Ethernet frame, and uses the PVID value allocated to the logical OLT port to determine the VLAN group to which the Ethernet frame belongs.

The operation of the above-constructed VLAN configuration system of the E-PON according to the embodiment of the present invention will be described with reference to the accompanying drawing as follows.

Figure 6:
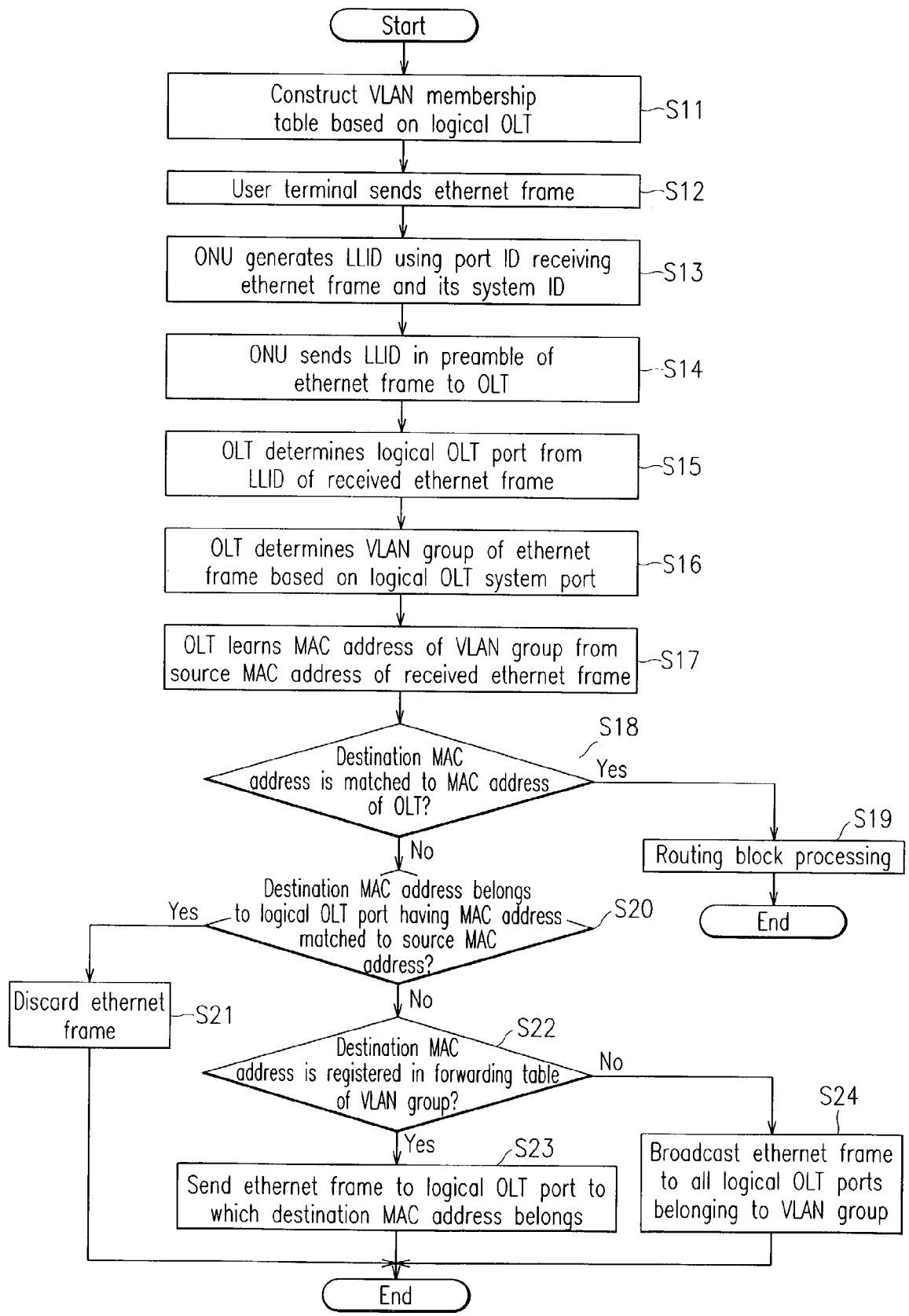
FIG. 6 is a flow chart of a VLAN configuration method of an E-PON according to an embodiment of the present invention.

FIG. 6 is a flow chart of a VLAN configuration method of the E-PON according to an embodiment of the present invention.

Referring to FIG. 6, the OLT maps its profile information and the profile information of the ONU connected to it via an E-PON interface, and constructs a VLAN membership table based on the logical OLT port (in step 11).

As the Ethernet frame is transferred from a subscriber terminal to an ONU (in step 12), the ONU generates an LLID including the ID of a port that receives the Ethernet frame and its system ID, and sends the Ethernet frame including the generated LLID in a preamble to the OLT (in steps 13 and 14).

The OLT determines a logical OLT port from the LLID value in the preamble of the received Ethernet frame, and selects a VLAN group to which the Ethernet frame belongs, with reference to the VLAN membership table constructed in the step 11 using the PVID value allocated to the logical OLT port (in steps 15 and 16).

Subsequently, the OLT learns the MAC (Medium Access Control) address of the corresponding VLAN group from the source MAC address of the Ethernet frame received from the ONU (in step 17), and determines whether or not a destination MAC address is matched to the MAC address of the OLT (in step 18).

If the destination MAC address is matched to the MAC address of the OLT, then the routing block performs an IP routing function (in step 19); otherwise, the OLT determines whether or not the destination MAC address belongs to the logical OLT port having a MAC address matched to the source MAC address (in step 20).

If the destination MAC address belongs to the logical OLT port having a MAC address matched to the source MAC address, then the OLT discards the corresponding Ethernet frame (in step 21); otherwise, it checks whether or not the destination MAC address is registered in the forwarding table of the corresponding VLAN group (in step 22).

If the destination MAC address is registered in the forwarding table of the corresponding VLAN group, then the OLT transfers the Ethernet frame to the logical OLT port to which the destination MAC address belongs (in step 23); otherwise, it broadcasts the Ethernet frame to all the logical OLT ports included in the corresponding VLAN group (in step 24).

Figure 7:
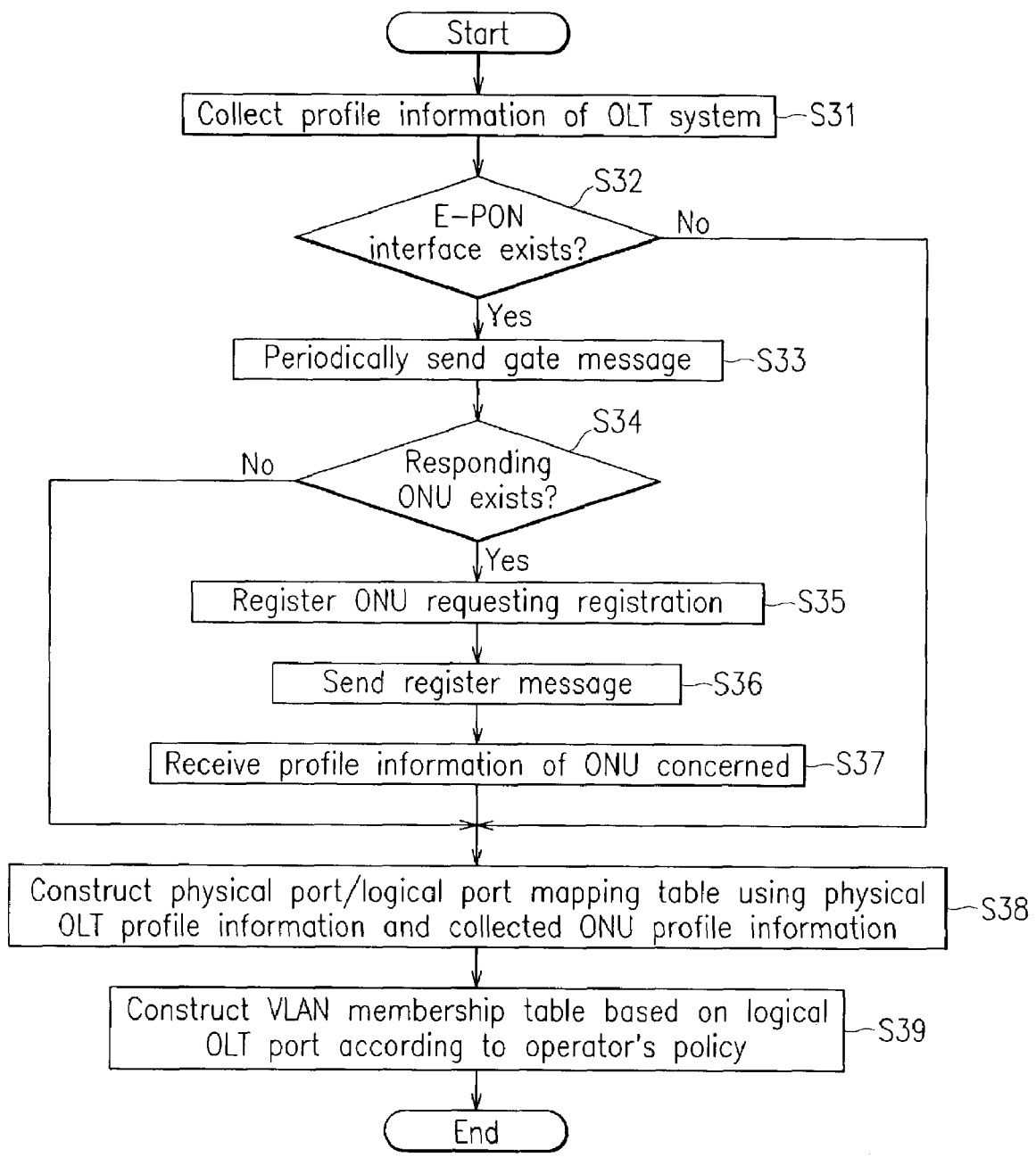
FIG. 7 is a flow chart of a VLAN set-up method based on the logical port at the OLT.

FIG. 7 is a flow chart of a VLAN set-up method based on the logical port at the OLT.

Referring to FIG. 7, for constructing the VLAN membership table, the OLT combines the number of ports and its profile information for the port-based interfaces during an initial operation, and checks whether or not there is an E-PON interface (in steps 31 and 32).

If there is an E-PON interface, then the OLT periodically sends a gate message to the E-PON interface according to an automatic ONU searching function of MPCP (MultiPoint Control Protocol) to check whether or not there is a new ONU (in step 33).

If there is an ONU responding to the gate message from the OLT, then the OLT registers the ONU requesting registration, allocates an ONU system ID to the ONU, and sends a register message including this information to the ONU to report the registration result to the ONU (in steps 33, 35, and 36).

The OLT communicates a control message with the registered ONU to acquire the profile information of the ONU concerned (in step 37).

After acquiring the profile information of the ONU, or when there is no E-PON interface, or when there is no ONU responding to the gate message from the OLT, the OLT constructs the profile information of the logical OLT using its final OLT profile information and the profile information of the ONU connected to it via the E-PON interface (in step 38).

Namely, the OLT constructs the logical LOT profile information in the form of a mapping table for physical port/logical port profile variations, as shown in FIG. 4.

The operator constructs a VLAN membership table using the PVID value allocated to the logical OLT port based on the physical port/logical port mapping table according to the policy (in step 39).

Figure 8:
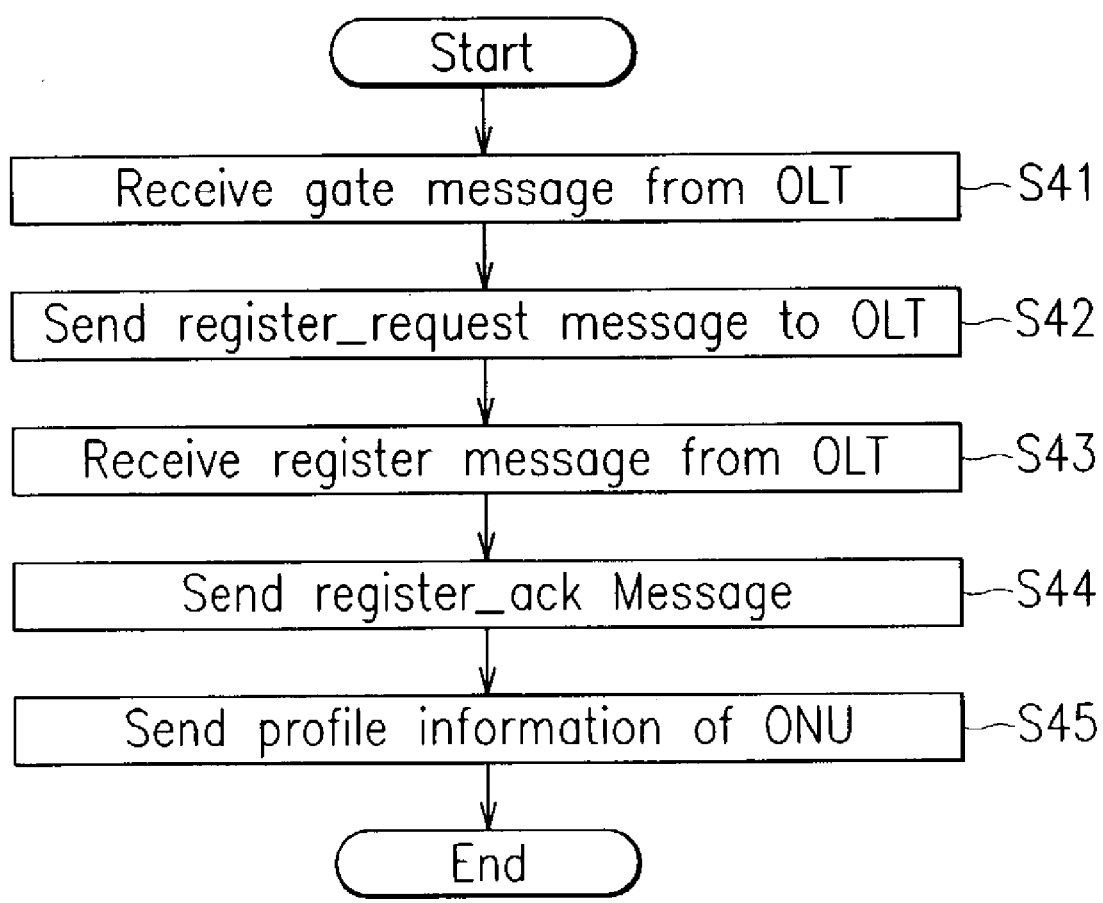
FIG. 8 is a flow chart showing the operation of the ONU connected to the OLT via an E-PON interface.

FIG. 8 is a flow chart of the operation of the ONU connected to the OLT via the E-PON interface.

Referring to FIG. 8, the ONU receives a gate message from the OLT (in step 41), and sends a register request REGISTER_REQUEST message to the OLT to request its registration (in step 42).

Upon receiving a register message including the register ONU system ID information from the OLT, the ONU sends a register acknowledgement REGISTER_ACK message to the OLT to confirm the registration (in steps 43 and 44).

The ONU communicates a control message to the OLT to inform the OLT of profile information on the number of its ports (in step 45).

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

As described above, the system and method for VLAN configuration of an E-PON and the recording medium with a stored program of the system and method according to the present invention allocate users in the ONU systems belonging to the same OLT port to different VLAN groups, and provide enhanced VLAN services for the E-PON users.

In addition, the system and method for VLAN configuration E-PON, and the recording medium with a stored program of the system and method according to the present invention cause the OLT to perform a function of managing the profile of the ONU systems and a function of transferring information among the users of the ONU systems, thereby minimizing the function of the ONU systems and securing the cost advantage of the ONU systems in providing chargeable services.

Furthermore, the system and method for VLAN configuration of an E-PON, and the recording medium with a stored program of the system and method according to the present invention, cause the ONU systems to operate as a terminal simply performing a multiplexing/demultiplexing function rather than as a conventional two-layer switch, thereby providing convenience in operation/maintenance and repair of the network and reducing the expense of management.

What is claimed is:

1. A system for virtual LAN constitution of an E-PON (Ethernet-Passive Optical Network), the system comprising:
a plurality of ONUs (Optical Network Units) located at subscribers' sites, the ONUs carrying a port ID (Identification) number and a system ID number on a logical link identifier and transferring an Ethernet frame including the logical link identifier; and
an OLT (Optical Link Terminal) located at a central telephone exchange's site or a headend's site, the OLT determining a virtual LAN group allocated to a logical port of the OLT using an ID of the logical port that receives the Ethernet frame from the plurality of ONUs and the logical link identifier included in the Ethernet frame, and providing a corresponding virtual LAN service, wherein the OLT maps its profile information and profile information of the ONUs to construct a virtual LAN membership table based on the logical port, and wherein the mapping between the OLT and the ONUs is coupling a physical OLT port number, the system ID number of the ONU, the port ID number of the ONU, and the corresponding logical link identifier to a logical port number of the OLT.

2. The system as claimed in claim 1, wherein the ONUs are connected to the OLT via an E-PON interface.

3. The system as claimed in claim 1, wherein the virtual LAN membership table includes an ID number of each virtual LAN group allocated to the logical port number of the OLT.

4. A method for virtual LAN constitution of an E-PON, the method comprising:
(A) mapping a port profile of an ONU to a port profile of an OLT, and constructing a virtual LAN membership table, wherein the mapping between the OLT and the ONU is coupling a physical OLT port number, the system ID number of the ONU, the port ID number of the ONU, and the corresponding logical link identifier to a logical port number of the OLT;
(B) the ONU transferring an Ethernet frame that includes a logical link identifier from a subscriber terminal to the OLT, where the logical link identifier is generated using an ID number of the ONU and an ID number of an ONU port;
(C) upon receiving the Ethernet frame from the ONU in the step (B), the OLT determining a logical OLT port using a port number of its port that receives the Ethernet frame and the logical link identifier; and
(D) upon determining the logical OLT port in the step (C), the OLT determining a virtual LAN group of the Ethernet frame from the virtual LAN membership table using information on the logical OLT port, and providing a virtual LAN service for the Ethernet frame.

5. The method as claimed in claim 4, wherein the step (A) of constructing the virtual LAN membership table comprises:
(a) combining OLT profile information, and checking whether or not there is an E-PON interface;
(b) if there is an E-PON interface according to the step (a), sending a periodic gate message to the E-PON interface so as to check whether or not there is a new ONU;
(c) registering the ONU responding to the gate message of the step (b), assigning an ONU system ID number, and informing the ONU of the ONU system ID number;
(d) receiving ONU profile information from the ONU acknowledging the ONU system ID number, and constructing a physical port/logical port mapping table using the OLT profile information and the ONU profile information; and (e) constructing a virtual LAN membership table including an ID number of each virtual LAN group allocated to the logical OLT port based on the physical port/logical port mapping table.

6. The method as claimed in claim 5, wherein the message processing steps (b) and (c) of the ONU comprise:
   (i) the ONU receiving a gate message from the OLT, and sending a registration request message of the corresponding ONU to the OLT; and
   (ii) upon receiving a message including an ONU system ID number from the OLT in response to the registration request message of the step (i), the ONU sending a registration acknowledgement message and its profile information to the OLT.

7. The method as claimed in claim 5, wherein the step (d) of constructing a physical port/logical port mapping table comprises:
   extracting an ID number of the logical OLT port from the ID numbers of the physical OLT port, the ONU, and the ONU port, and combining these ID numbers.

8. The method as claimed in claim 7, wherein the ID number of the logical OLT port is calculated according to the following equation:

$$\text{ID number of logical OLT port} = (\text{physical OLT port number} \times \text{ONU system threshold}) = \{(\text{ONU system} -1) \times \text{ONU port threshold}\} + \text{physical ONU port number}$$

wherein the ONU system threshold is the minimum value of $2^n$ ($n=1, 2, 3, \ldots$) greater than (the maximum number of ONU systems allowed for one OLT port×ONU port threshold);
and
   the ONU port threshold is the minimum value of $2^n$ ($n=1, 2, 3, \ldots$) greater than the maximum number of ports allowed for one ONU system.

9. The method as claimed in claim 4, wherein the step (C) of determining a logical OLT port comprises:
   (a) determining an ID number of the OLT port that receives the Ethernet frame;
   (b) determining the ONU system ID number and the port ID number from the logical link identifier of the Ethernet frame; and
   (c) determining the ID number of the logical OLT port from the ID numbers of the OLT port, the ONU system, and the ONU port.

10. The method as claimed in claim 4, wherein the step (D) of determining a virtual LAN group comprises:
    the OLT determining the virtual LAN group including the Ethernet frame using the logical OLT port information extracted from the received Ethernet frame, according to the ID number of the virtual LAN group allocated to the logical OLT port in constructing the virtual LAN membership table.

11. The method as claimed in claim 4, wherein the step (D) of providing a virtual LAN service comprises:
    (a) the OLT learning an MAC (Medium Access Control) address of the corresponding virtual LAN group from the source MAC address of the Ethernet frame;
    (b) if a destination MAC address is not matched to the MAC address of the OLT in the MAC address of the virtual LAN group according to the step (a), the OLT checking whether or not the destination MAC address belongs to the logical OLT port having the same MAC address as the source MAC address;
    (c) if the destination MAC address does not belong to the logical OLT port having the same MAC address as the source MAC address according to the step (b), the OLT checking whether or not the destination MAC address is registered in the table of the corresponding virtual LAN group;
    (d) if the destination MAC address is registered in the table of the corresponding virtual LAN group according to the step (c), the OLT sending the Ethernet frame to the logical OLT port having the destination MAC address belonging thereto; and
    (e) if the destination MAC address is not registered in the table of the corresponding virtual LAN group according to the step (c), the OLT broadcasting the Ethernet frame to all the logical OLT ports having the corresponding virtual LAN group belonging thereto.

12. The method as claimed in claim 11, wherein if the destination MAC address is matched to the MAC address of the OLT according to the step (b), an IP routing function is performed instead of a two-layer switch function for the virtual LAN service.

13. The method as claimed in claim 11, wherein if the destination MAC address belongs to the logical OLT port having the same MAC address as the source MAC address according to the step (c), the Ethernet frame is discarded.

14. A recording medium with a stored program containing instructions that, when executed, cause a machine to perform a method comprising:
    mapping a port profile of an ONU to a port profile of a logical OLT, and constructing a virtual LAN membership table, wherein the mapping between the OLT and the ONU is coupling a physical OLT port number, the system ID number of the ONU, the port ID number of the ONU, and the corresponding logical link identifier to a logical port number of the OLT;
    sending an Ethernet frame transferred from the ONU to an OLT, the Ethernet frame carrying a port number of a port that receives the Ethernet frame, and a logical link identifier for an ID number of the ONU;
    causing the OLT receiving the Ethernet frame to determine a logical OLT port using a port number of its port that receives the Ethernet frame and the logical link identifier; and upon determination of the logical OLT port, the OLT determining a virtual LAN group of the Ethernet frame from the virtual LAN membership table using the logical OLT port information, and providing a virtual LAN service for the Ethernet frame.

* * * * *